United States Patent
Peters

(10) Patent No.: US 9,868,172 B2
(45) Date of Patent: Jan. 16, 2018

(54) ARC WELDING WITH WAVEFORM CONTROL FUNCTION

(71) Applicant: LINCOLN GLOBAL, INC., City of Industry, CA (US)

(72) Inventor: Steven R. Peters, Huntsburg, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 1350 days.

(21) Appl. No.: 13/789,734

(22) Filed: Mar. 8, 2013

(65) Prior Publication Data
US 2014/0251967 A1    Sep. 11, 2014

(51) Int. Cl.
*B23K 9/09* (2006.01)
*B23K 9/00* (2006.01)

(52) U.S. Cl.
CPC .................... *B23K 9/091* (2013.01)

(58) Field of Classification Search
CPC .... B23K 9/091; B23K 9/0956; B23K 9/1006; B23K 9/092; B23K 9/0253
USPC ........ 219/130.21, 130.1, 137 PS, 130.51, 61
See application file for complete search history.

(56) References Cited

U.S. PATENT DOCUMENTS

| | | | | |
|---|---|---|---|---|
| 5,747,972 | A * | 5/1998 | Baretich | G05F 1/613 323/223 |
| 6,723,957 | B2 * | 4/2004 | Holverson | B23K 9/0213 219/130.51 |
| 8,269,141 | B2 * | 9/2012 | Daniel | B23K 9/1006 219/130.1 |
| 2003/0085254 | A1 * | 5/2003 | Katooka | B23K 9/10 228/101 |
| 2005/0242076 | A1 * | 11/2005 | Stava | B23K 9/1068 219/130.5 |
| 2006/0070983 | A1 * | 4/2006 | Narayanan | B23K 9/092 219/130.51 |
| 2008/0083705 | A1 * | 4/2008 | Peters | B23K 9/1068 219/61 |

(Continued)

FOREIGN PATENT DOCUMENTS

| | | |
|---|---|---|
| EP | 1645352 A1 | 4/2006 |
| WO | 2008/045584 A1 | 4/2008 |

OTHER PUBLICATIONS

International Application No. PCT/IB2014/000276, International Search Report, 9 pages, dated Nov. 17, 2014.

*Primary Examiner* — Michael Laflame, Jr.
(74) *Attorney, Agent, or Firm* — Perkins Coie LLP

(57) ABSTRACT

A power supply with a waveform control function is provided. The power supply includes a waveform type selector that selects a desired shape for an output waveform and a setpoint selector that sets an output setpoint for the power supply. The power supply further includes a waveform generator that generates a reference waveform signal. The waveform generator includes a target generation circuit that generates a plurality of target values corresponding to the reference waveform signal. The waveform generator also includes a transition circuit that performs a series of transitions between the plurality of target values to generate the reference waveform signal, and a ramp circuit that controls a ramp speed of at least one transition of the series of transitions based on the desired shape. The generation of a target value corresponding to a peak value of the reference waveform signal is based on at least the output setpoint.

20 Claims, 9 Drawing Sheets

(56) References Cited

U.S. PATENT DOCUMENTS

2010/0308026 A1\* 12/2010 Vogel ................... H02M 3/157
219/130.21

\* cited by examiner

ARC WELDING WITH WAVEFORM CONTROL FUNCTION

TECHNICAL FIELD

Certain embodiments relate to arc welding applications. More particularly, certain embodiments relate to generating output waveforms for brazing, cladding, building up, filling, hard-facing overlaying, joining and welding applications.

BACKGROUND

In related art power supplies for brazing, cladding, building up, filling, hard-facing overlaying, joining and welding applications, for example gas shielded tungsten arc welding (GTAW) systems, some power supplies allow the operator to select between different welding waveforms. Typically, the operator is given a choice between an advanced ("crisp") square wave, a "soft" square wave, a sine wave, and a triangle wave. Each of these waveforms has certain advantages and the operator chooses the best waveform for the specific application. For example, the advanced square wave provides fast transitions for a responsive, dynamic, and focused arc and better directional control. The soft square wave provides a smoother, softer arc with a more fluid weld puddle than the advanced square wave. The sine wave provides the soft-arc feel of a conventional power source. The triangular wave combines the effect of peak amperage while reducing overall heat input. This leads to quick puddle formation and, because of the lower heat input, reduced weld distortion, especially on thin metal.

However, each waveform also has it disadvantages. For example, because noise is proportional to how fast the current changes, the advanced square wave has the most noise, with the soft square wave, sine wave, and the triangle wave following in descending order of noise. Similarly, the square wave has the most heat input to the workpiece with the triangle wave the least. However, the other waveforms do not provide the responsiveness and control of the square wave. Accordingly, the operator must balance responsiveness and control of the arc with noise. With related arc welding machines, the selection is limited to the four waveforms discussed above. There is no way for the operator to choose a waveform that is between, for example, a sine wave and a triangle wave in order to get the optimum waveform for a particular application.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

Embodiments of the present invention comprise selecting the output waveform in power supplies used for any of brazing, cladding, building up, filling, hard-facing overlaying, joining and welding applications. The present invention comprises a power supply that includes a selection circuit configured to select a waveform from a plurality of waveforms, each waveform representing an incremental change from an adjacent waveform. The power supply also includes a waveform generator that is configured to output a reference signal based on the selected waveform. Further, the power supply includes a comparator circuit configured to receive a feedback signal representing at least one of an output current and an output voltage from the power supply, and configured to output an error signal representing the difference between the feedback signal and the reference signal. In addition, the power supply includes an inverter circuit configured to change the output of the power supply based on the error signal.

In some exemplary embodiments, the power supply includes a waveform type selector that selects a desired shape for an output waveform and a setpoint selector that sets an output setpoint for the power supply, e.g., a peak or average output current value, a peak or average output voltage value, etc. The power supply further includes a waveform generator that generates the reference waveform signal based on the desired shape. The waveform generator includes a target generation circuit that generates a plurality of target values corresponding to the reference waveform signal. The waveform generator also includes a transition circuit that performs a series of transitions between the plurality of target values to generate the reference waveform signal, and a ramp circuit that controls a ramp speed of at least one transition of the series of transitions based on the desired shape. The generation of a target value corresponding to a peak value (e.g., peak current or peak voltage) of the reference waveform signal is based on at least the output setpoint.

In some embodiments the waveform generator includes a digital signal processor that generates a digital reference waveform by modifying the desired waveform based on at least the output setpoint. The waveform generator can also include a digital-to-analog converter that converts the digital reference waveform to the reference waveform signal.

These and other features of the claimed invention, as well as details of illustrated embodiments thereof, will be more fully understood from the following description and drawings.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Figure 1:
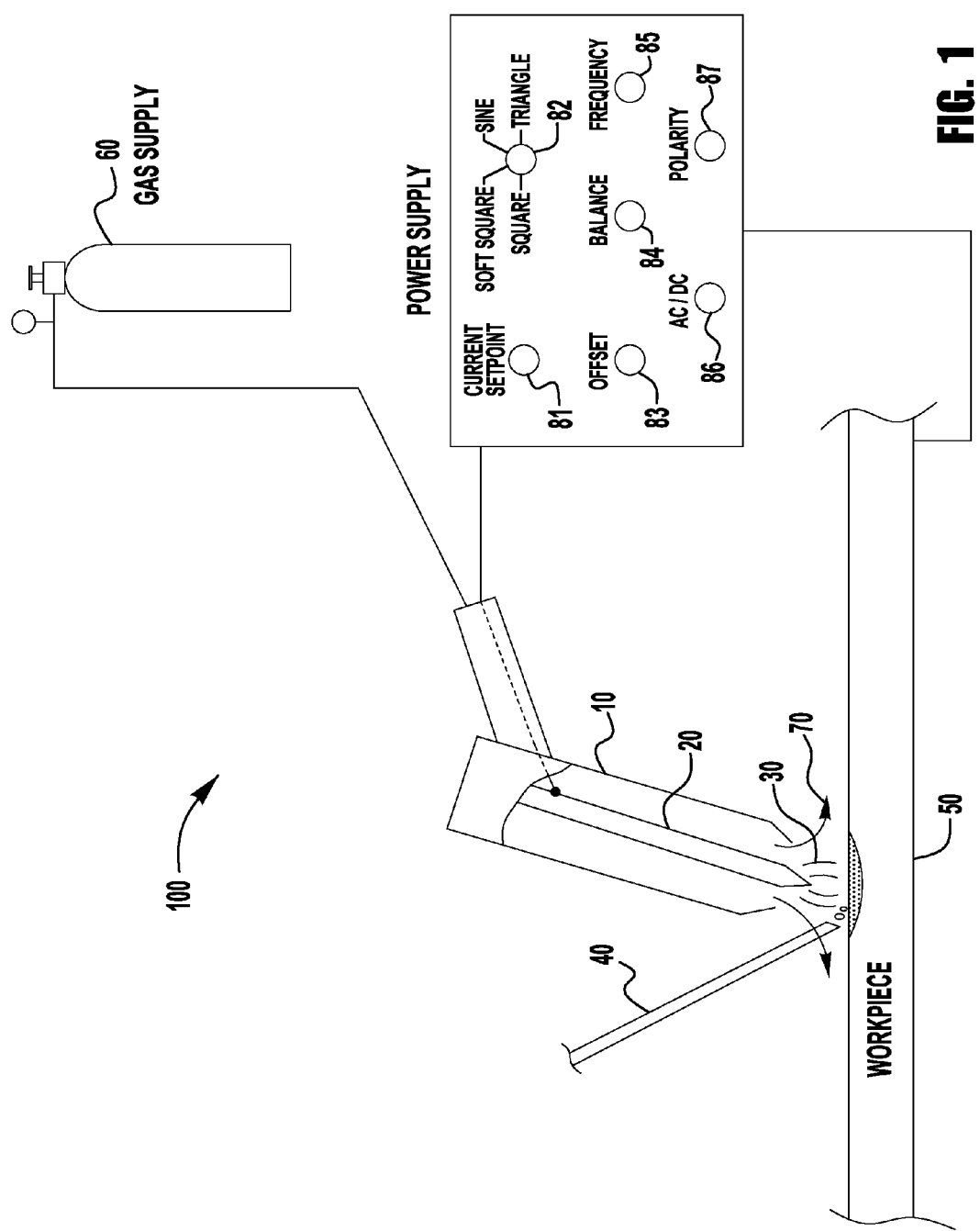
FIG. 1 illustrates a functional schematic block diagram of an exemplary embodiments of a system for any of brazing, cladding, building up, filling, hard-facing overlaying, joining, and welding applications.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

FIG. 1 illustrates a system 100 for any of brazing, cladding, building up, filling, hard-facing overlaying, joining, and welding applications. The system 100 includes a GTAW welding power supply 80, which can be an inverter-type power supply. The power supply 80 may allow the operator to input a current setpoint via knob 81 representing, e.g., a desired average welding current or a desired peak welding current. The power supply may also include a waveform type input knob 82 that allows the operator to vary the shape of the output welding waveform as discussed further below. In addition to the waveform type input knob 82, the shape of the output welding waveform may also be determined by one or more of the following: an offset knob 83, which injects a DC offset to the output welding waveform; a balance knob 84, which determines the amount of time the output welding waveform is in the positive portion of its cycle and in the negative portion of its cycle; and a frequency knob 85, which determines the frequency of the output welding waveform. The power supply 80 may also include an AC/DC switch 86 that allows the operator to select between an AC welding waveform and a DC welding waveform. For DC welding, the power supply 80 allows the operator to select the welding polarity (switch 87), i.e., whether electrode 20 is at positive polarity with respect to workpiece 50 or at negative polarity. The power supply 80 can include other controls (not shown) for setting voltage, power, etc. The power supply 80 is operatively connected to electrode 20, which is housed in torch 10. The power supply 80 and electrode 20 produce an arc 30, which heats workpiece 50. An optional wire feed system (not shown) can feed filler wire 40, which provides filler material for joining, welding, brazing, cladding, etc. Gas supply 60 provides shielding gas 70 to a torch 10 to shield the arc 30 and the weld puddle 145 from atmospheric nitrogen and oxygen, which adversely affect weld quality.

Figure 2:
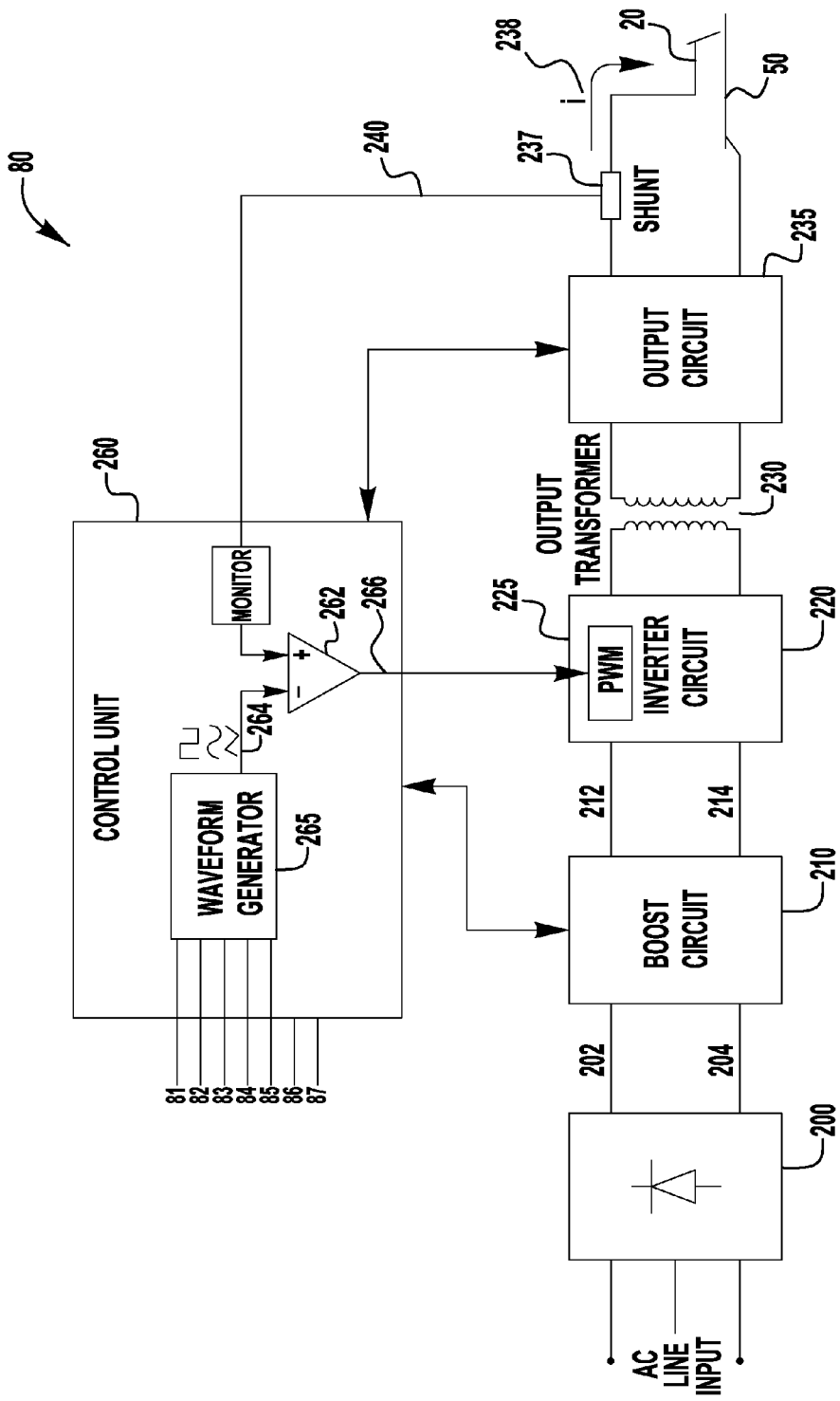
FIG. 2 illustrates a block diagram of an exemplary embodiment of a power supply that can be used in the system of FIG. 1.

In some exemplary embodiments, the power supply 80 can be an inverter-type power supply as shown in FIG. 2. The illustrated power supply is generally known in the art and, for brevity, only a high-level overview is given, except for details discussed herein, below. The rectifier 200 receives single or three phase line AC voltage and rectifies it to a DC voltage, which is output on lines 202 and 204. Typically, the input line AC voltage can range from 100 volts to 575 volts at 50 Hz or 60 Hz depending on the country. Of course, the input AC voltage can be provided by a stand-alone generator rather than from a utility line. After being rectified, the DC voltage on bus 202/204 is received by a boost circuit 210, which boosts the input DC voltage to a desired value, e.g., 400 volts. The boost circuit 210 regulates the voltage on bus 212/214 at the desired value even if there are fluctuations in the input AC voltage. In some embodiments, depending on the input AC line voltage and the desired DC voltage on bus 212/214, circuit 210 can be a buck circuit or a buck/boost circuit rather than just a boost circuit. In addition, the circuit 210 can be configured to provide power factor correction if desired. The regulated DC voltage on bus 212/214 is then converted to high frequency AC by inverter 220. The AC from the inverter 220 is converted to a voltage appropriate for welding by transformer 230 and output circuit 235. The output circuit 235 outputs the appropriate welding waveform. The configuration of output circuit 235 is well known in the art and will not be further discussed. Also, an engine driven welder can provide welding power directly and control technology similar to that discussed herein can be used.

The control unit 260 monitors the instantaneous output current 238 via a feedback signal 240 from shunt (or similar component) 237. Among other things, the control unit 260 can use the feedback signal 240 to adjust the output of inverter 220 such that the output current 238 is maintained at the desired value. In an exemplary embodiment, the control unit 260 includes a comparator 262. The feedback signal 240 is sent to the positive input of comparator 262. The negative input of comparator 262 receives a reference signal 264 from waveform generator 265. In some embodiments, the reference signal 264 is based on at least one of the current setpoint knob 81, the waveform type knob 82, the offset knob 83, the balance knob 84, and the frequency knob 85 and represents the operator selected waveform shape, e.g., a sine wave, square wave (advanced or soft), or triangle wave or another shape that incorporates the appropriate offset, balance, frequency, and current setpoint. The output of comparator 262 is an error signal 266 representing the difference between the feedback signal 240 and the reference signal 264. In some embodiments, the error signal 266 is sent to pulse width modulator (PWM) circuit 225 of inverter 220. The PWM circuit 225 varies the duty cycle of the switches (not shown) in inverter 220 in order to eliminate the error. Thus, the current 238 at the output of output circuit 235 is forced to follow the shape of the reference waveform signal 264. The operation of PWM circuit 225 and inverter 220 are well known in the art and will not be further discussed. In exemplary embodiments, the operating frequency of inverter 220 is greater than the frequency of the output waveform from output circuit 235. For example, the frequency of the inverter 220 can be in the range of 20 kHz to 100 kHz or higher and the frequency of the output welding waveform can be in the range of 10 Hz to 300 Hz.

Figure 6:
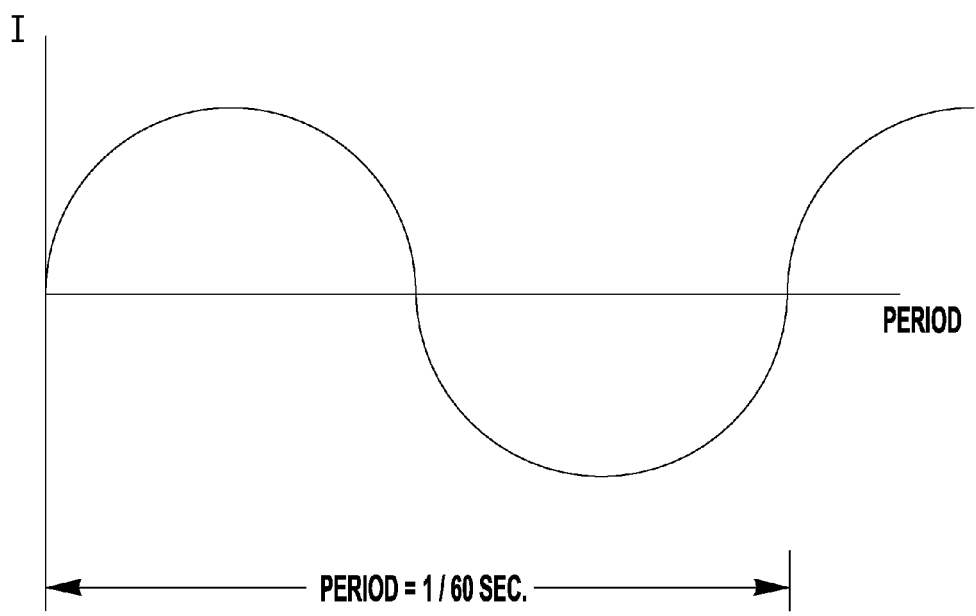
FIG. 6 illustrates exemplary sine wave that can be generated by the waveform generator of FIG. 2.

The waveform generator 265 receives the selected waveform type (knob 82) and generates the appropriate reference waveform signal 264. The reference waveform 264 signal may be modified based on the current setpoint (knob 81), the offset (knob 83), the balance (knob 84) and/or the frequency (knob 85). For example, if a sine wave is selected on the waveform type knob 82, a zero offset is selected on knob 83, a zero balance adjustment is selected on knob 84, and a 60 Hz frequency is selected on knob 85, the waveform generator 265 will output a reference signal 264 in the shape of a 60 Hz sine wave as shown in FIG. 6. The generated reference signal 264 will then be sent to the negative input of the comparator 262. The comparator 262 will then output the error signal 266 to inverter 220 as discussed above to force output current 238 to be in a form corresponding to the reference sine wave. Similarly, other waveforms can be generated by waveform generator 265 as reference signals 264 and inverter 220 can be controlled such that the output current 238 matches these other reference signals 264.

Figure 3:
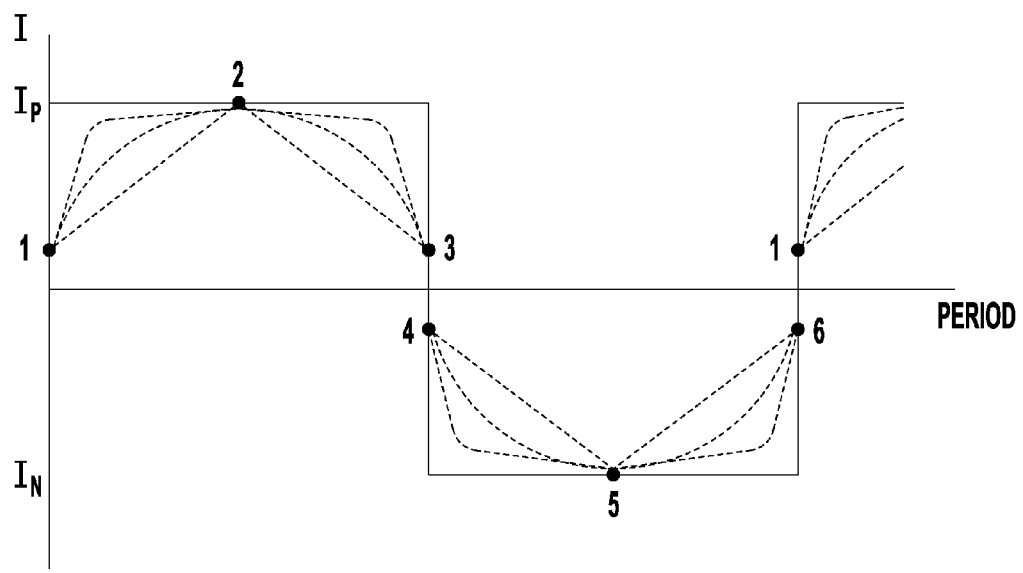
FIG. 3 illustrates exemplary waveforms that can be generated by the waveform generator of FIG. 2.

FIG. 3 illustrates an exemplary variation in waveform shapes that may be output by waveform generator 265 as reference waveform signals. The exemplary reference waveform signals can vary from a square wave 310 to a triangle wave 320 and can include any number of intermediate waveforms 330, which may include a sine wave, a "soft"

square wave or other waveform shapes. That is, unlike conventional power supplies, the waveform type knob 82 can be turned to intermediate positions instead of being limited to the waveform shapes found on conventional welding machines. In some embodiments, the intermediate waveform shapes are discrete waveforms that can be selected by knob 81. In other embodiments, the change in the intermediate waveform shapes is smooth and continuous as the knob 81 is rotated.

As illustrated in FIG. 3, an exemplary method of generating the desired reference waveform includes performing a series of transitions between six points (1-6) on the reference waveform. An exemplary embodiment of this method is illustrated in the flow chart of FIG. 4. As shown in step 410, the transition between point 1 and point 2 includes a positive ramp up function that defines the first half of the positive portion of the reference waveform 264. The positive ramp up function may include a target current term $A^P$ and a speed term $B^P$. In exemplary embodiments of the present invention, the waveform generator 265 determines the target current term $A^P$ and the speed term $B^P$. The target current term $A^P$ represents the peak current value of the reference waveform and is at least a function of the current setpoint (knob 81). For example, if the current setpoint of knob 81 represents the peak output current of power supply 80, the waveform generator 265 will determine that the target current term $A^P$ is a value equivalent to the current setpoint of knob 81. In this case, the peak value of the generated reference waveforms would look similar to FIG. 3 where all reference waveforms have the same peak current values at points 2 and 5 (the balance and offset adjustments are zero for the illustrated waveforms in FIG. 3).

Figure 5:
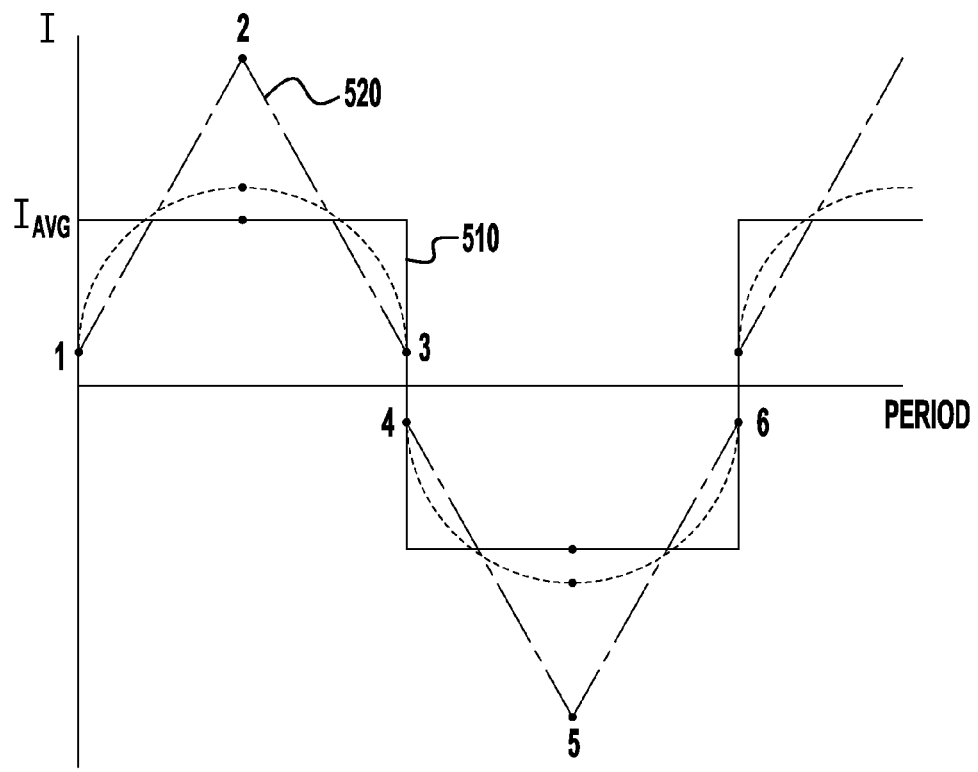
FIG. 5 illustrates exemplary waveforms that can be generated by the waveform generator of FIG. 2.

However, in some embodiments, e.g., when the current setpoint knob 81 represents the average output current of power supply 80, the target current term $A^P$ can be a function of the current setpoint (knob 81) and at least one of the waveform type (knob 82), the offset (knob 83), and the balance (knob 84). For example, as illustrated in FIG. 5, when the current setpoint knob 81 represent the average output current, the waveform generator 265 will establish a different target current term $A^P$ for each of the respective waveform shapes in order to maintain the average output current selected on knob 81. In the case of the square wave 510, the average current equals the peak current for an ideal square wave (assuming the balance and offset adjustments are zero), and the target current term $A^P$ will be the same as $I_{avg}$. However, in the case of other wave shapes, the target term $A^P$ will be higher than the $I_{avg}$ value for the respective waveform. This is because a higher peak current may be required in order to maintain the average current output of power supply 80 at the setpoint on knob 81 (assuming the balance and offset adjustments are zero). For example, for the triangle wave 520, the target current term $A^P$ will be $2 \times I_{avg}$ in order to maintain the average output current of power supply 80 at $I_{avg}$. Similarly, based on the selected waveform type (knob 82) and the setting of the offset knob 83 and/or balance knob 84, the target current term $A^P$ may need to be further adjusted by waveform generator 265 in order to maintain the average output current of power supply 80 at the value selected by knob 81. In some embodiments, the waveform generator 265 includes an adaptive control circuit (not shown) that automatically adjusts the target current terms (e.g., $A^P$ and the target terms discussed below—$C^P$, $A^N$ and $C^N$) based on the waveform type, offset, and/or balance.

As indicated above, the positive ramp up function that defines the waveform between points 1 and 2 on FIG. 3 may also include a speed term $B^P$. The speed term $B^P$ determines how fast the current value ramps up to the value of the target current term $A^P$. In some embodiments, the speed term $B^P$ represents a time constant, such as that for an RC circuit, of the ramp up circuit. By varying the time constant and appropriately scaling the output, the reference waveforms ranging from the square wave 310 to the triangle wave 320, including intermediate waveforms 330, may be reproduced (or reasonably approximated) from point 1 to point 2. In the case of the square wave 310, the speed term $B^P$ (or time constant) would be at its fastest as the current value ramps to $I_P$ near instantaneously. For the triangle wave 320, the speed term $B^P$ (or time constant) would be slower and scaled appropriately such that only the linear portion (or nearly linear portion) of the time constant curve is used. The speed term $B^P$ for the other reference waveforms would fall somewhere between the value for the square wave 310 and the value for the triangle wave 320. Along with the waveform type (knob 82), the time constant may be affected by the offset (knob 83), balance (knob 84), and frequency (knob 85) settings. Accordingly, based on the type of waveform, the speed term $B^P$ may be further adjusted by waveform generator 265 to account for the offset, balance, and/or frequency settings in order to ramp up to the value of the target current term $A^P$ within the given time period.

Figure 4:
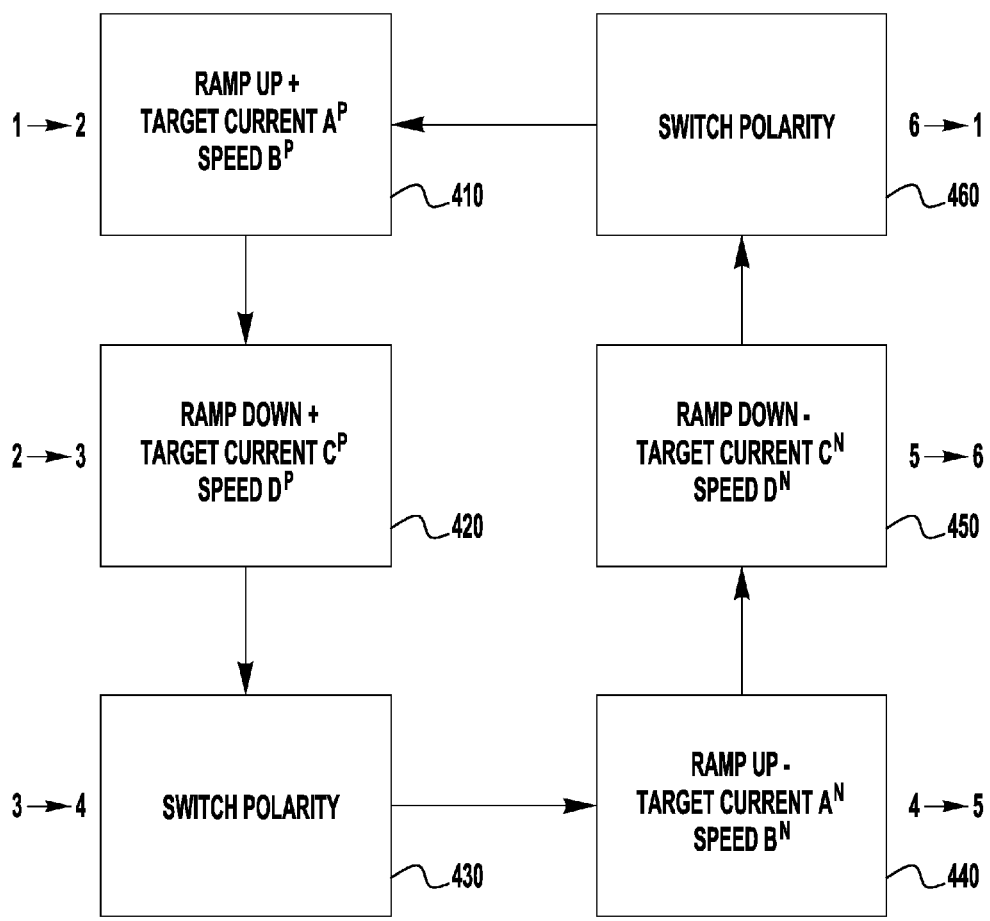
FIG. 4 illustrates an exemplary embodiment of a waveform generation method used by the waveform generator of FIG. 2.

At step 420 of FIG. 4, the waveform generator 265 generates the second half of the positive portion of the reference waveform. In this case, a positive ramp down function is incorporated into appropriate circuitry in waveform generator 265. Similar to the positive ramp up function, the positive ramp down function may include a target current term $C^P$ and a speed term $D^P$. In this case, the target current term $C^P$ is the value at which the waveform will switch polarity. In some exemplary embodiments, such as that illustrated in FIG. 3, the switch to negative polarity (step 430) will occur at a value above zero in order to maintain the stability of the arc 30. However, in other embodiments, the switch to negative polarity may occur at zero volts. In these embodiments, the power supply 80 may incorporate a high frequency arc starter, a capacitor discharge circuit, or some other circuit to reignite the arc. Turning back to step 420, the target current term $C^P$ may be the same for all waveforms as illustrated in FIG. 3 or may be different based on the waveform type. In some embodiments, the target current term $C^P$ can be adjusted by the operator using a selection knob (not shown).

The positive ramp down function of step 420 may also include a speed term $D^P$ that represents how fast the value of the reference waveform 264 will go from point 2 to point 3. Similar to the speed term $B^P$ of the positive ramp up function discussed above, the speed term $D^P$ can represent a time constant, such as that for an RC circuit. However, in this case, the speed term $D^P$ is the time constant of an appropriate ramp down circuit. Similar to the speed term $B^P$, the speed term $D^P$ can be a function of the waveform type (knob 82), the offset (knob 83), the balance (knob 84), and/or the frequency (knob 85). The functional description of the speed term $D^P$ is similar to that of speed term $B^P$ given above, and for brevity, will not be further discussed.

As indicated above, when the value of the reference waveform reaches that of target current term $C_P$ (point 3), the waveform generator 265 will switch polarity (step 430) and the value of the reference waveform will be set to $A^N$ (point 4). At step 440, the negative ramp up function is initiated from point 4 to point 5. Similar to the positive ramp up function in step 410, the negative ramp up function may include a target current term $A^N$ and a speed term $B^N$, which are similar in function to $A^P$ and $B^P$, respectively. The above discussion with respect to the positive ramp up function in step 410 is applicable to the negative ramp up function in 440 and therefore, the negative ramp up function will not be further discussed. After executing the negative ramp up function of the reference waveform in step 440, the waveform generator 265 will go to step 450, where it will execute the negative ramp down function from point 5 to point 6. Similar to the positive ramp down function in step 420, the negative ramp down function may include a target current term $C^N$ and a speed term $D^N$. The terms $C^N$ and $D^N$ are analogous to the terms $C^P$ and $D^P$, respectively, discussed above. At step 460, the waveform generator 265 switches the polarity again and the positive portion of the waveform cycle will repeat starting at step 410.

The present invention is not limited to the six transition points discussed above and can have more or less transition points. In addition, the present invention is not limited to generating reference waves using time constants as discussed above. In some embodiments, the speed terms may be generated from any type of analog or digital circuit as long as it can reproduce (or reasonably approximate) one or more of the desired reference waveforms. Of course, although the selections of the current setpoint, waveform type, offset, balance, and frequency are shown as settings on knobs in the above exemplary embodiments, the power supply 80 may incorporate any type of input interface, including keyboards, mice, pushbuttons, touch screens, LAN, WAN, wireless, etc.

Figure 7:
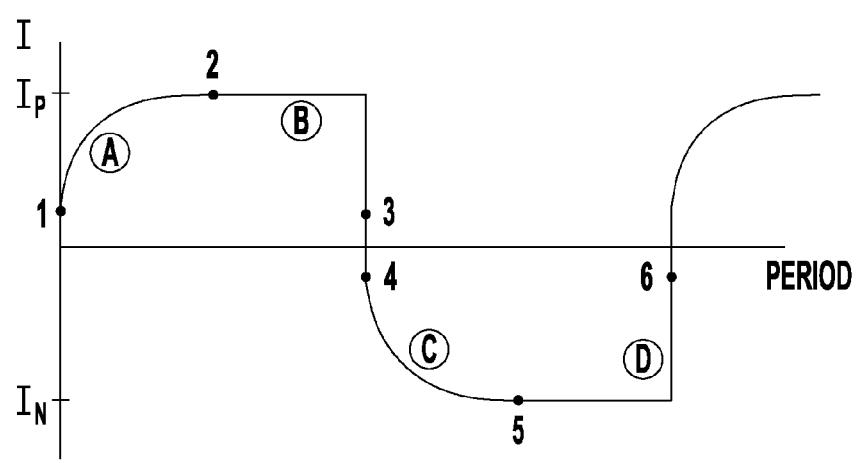
FIG. 7 illustrates an exemplary waveform that can be generated by a waveform generator consistent with the present invention.

In addition, the present invention is not limited to a single knob (e.g., knob 81) to define the desired waveform type and can include separate knobs corresponding to waveform segments. For example, the waveform shape transitions between points 1-6 of FIG. 3 may be defined separately as illustrated in FIG. 7. In FIG. 7, each ramp up and ramp down function discussed above may have its own control knob A-D (not shown). For example, knob A can be configured to control the positive ramp up function, knob B the positive ramp down function, knob C the negative ramp up function, and knob D the negative ramp down function. In some embodiments, the waveform generator 265 can store the defined waveform so that the operator is not required to remember the setting of each knob in subsequent welding operations.

Figure 8:
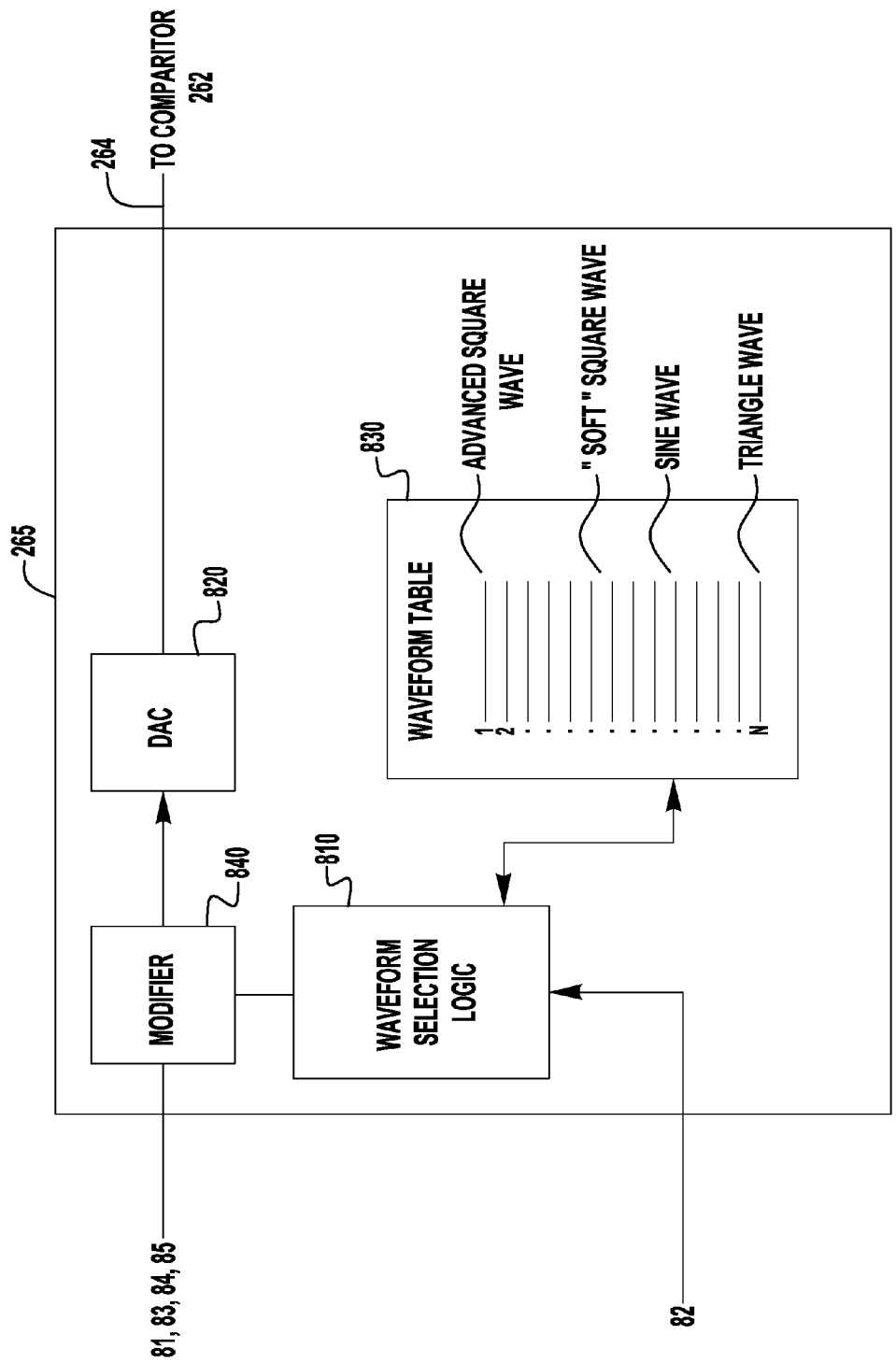
FIG. 8 illustrates a block diagram of an exemplary embodiment of a function generator that can be used in the power supply of FIG. 2.

In some exemplary embodiments, as illustrated in FIG. 8, the waveform generator 265 is a digital signal processor (DSP) and includes a waveform table 830, which can allow for the selection of pre-generated intermediate waveforms between an advanced square wave to a "soft" square wave, from a "soft" square wave to a sine wave, and/or from a sine wave to a triangle wave. In exemplary embodiments, these intermediate waveforms represent incremental changes from an adjacent waveform shape to give the operator more precise control of the welding waveform. For example, FIGS. 9A-C illustrate waveform shapes that are "morphed" from one standard waveform shape to another, and each of these "morphed" waveform shapes may be stored digitally in waveform generator 265.

In exemplary embodiments of the present invention, a waveform table 830 stores digital representations of a plurality of waveforms (shown as 1-N in FIG. 8). Although illustrated in separate FIGS. 9A-C for clarity, the waveform table 830 may include any combination of the waveform shapes (standard and non-standard) illustrated in FIGS. 9A-C. The number of available waveforms is not limiting and will depend on the size of memory for waveform table 830. The method of storage is also not limiting and the waveform table 830 can be stored in ROM, RAM, EPROM, etc. Based on the position of waveform type knob 82, the waveform selection logic 310 selects the appropriate waveform from table 330, and based on the current setpoint (knob 81), offset (knob 83), balance (knob 84), and/or frequency (knob 85) settings, the waveform generator 265 can appropriately modify the selected waveform (logic 840) to generate a digital representation of the reference waveform. The reference digital waveform is then sent to a digital-to-analog converter (DAC) 820, which converts the digital values to an analog waveform. The analog waveform is then sent to comparator 262 as the reference waveform 264.

Figure 9A:
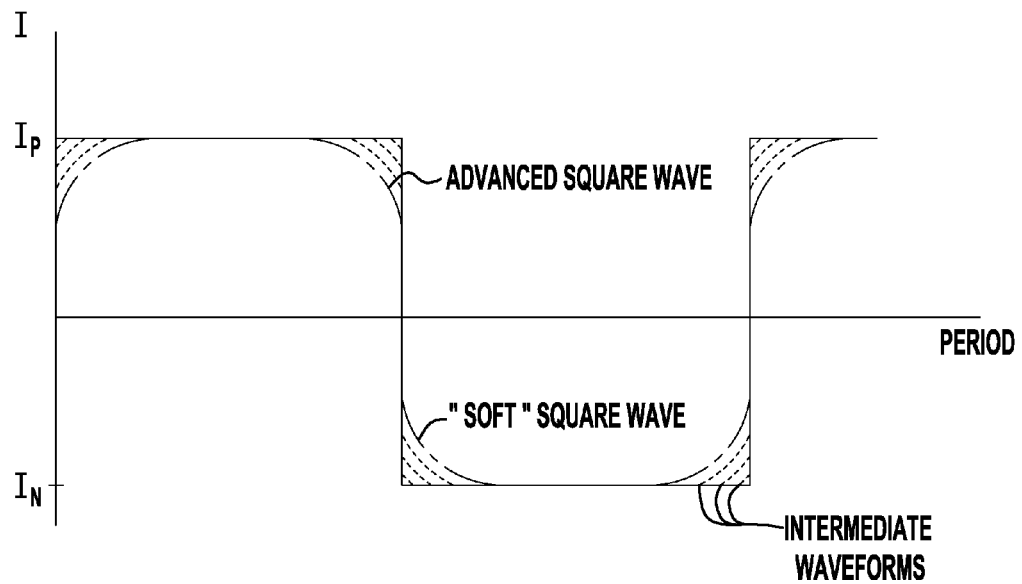
FIGS. 9A-9C illustrate exemplary waveforms that can be generated by the function generator of FIG. 8.
Figure 9B:
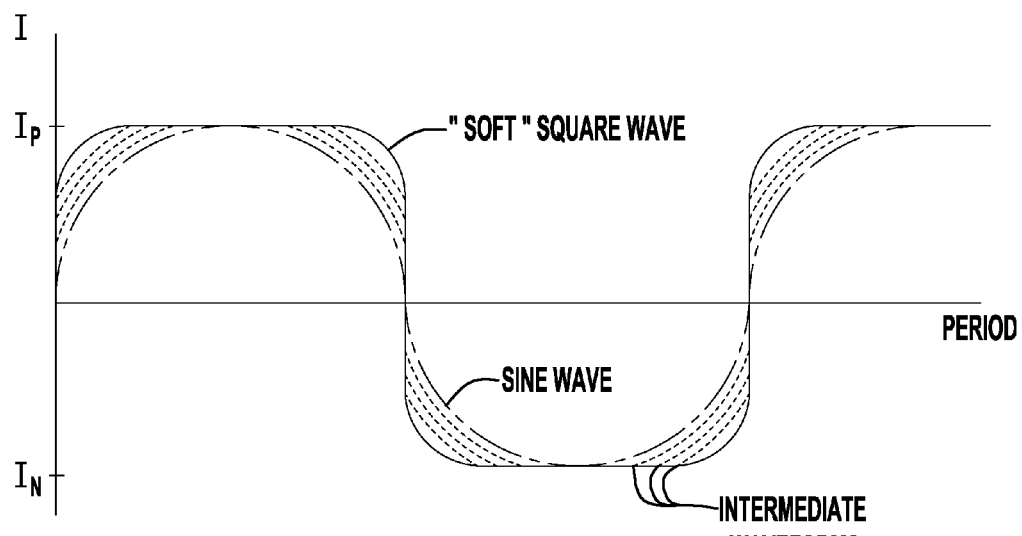
Figure 9C:
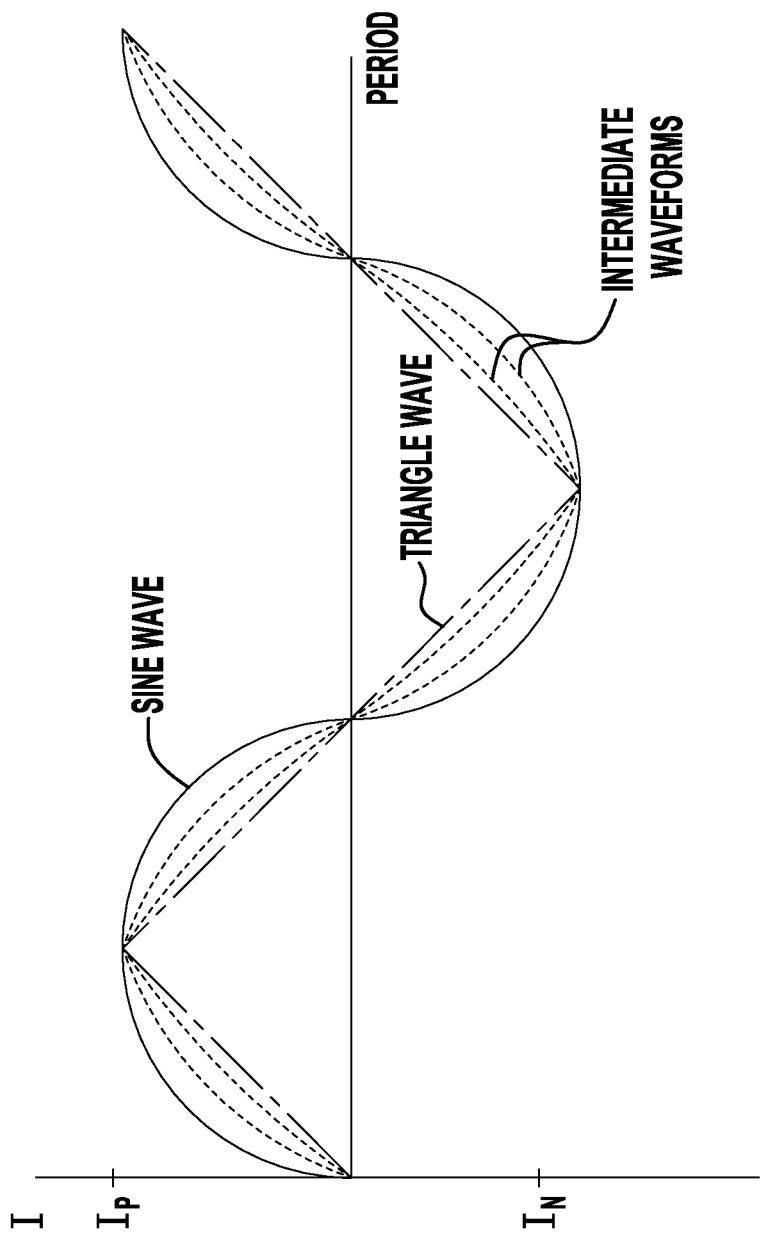
Figure 10A:
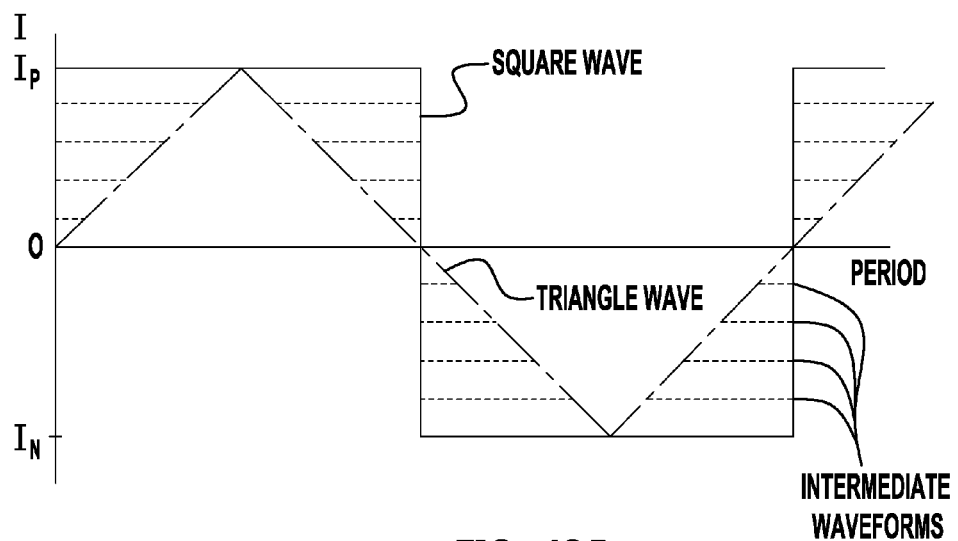
FIGS. 10A-10B illustrate exemplary waveforms that can be generated by the function generator of FIG. 8.
Figure 10B:
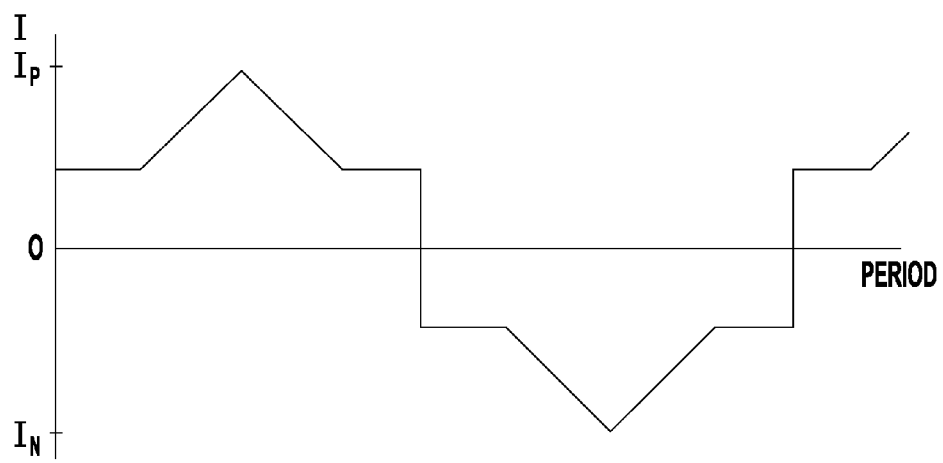

Of course, the "morphing" is not limited to only being between the standard endpoint waveforms shapes shown in FIGS. 9A-C, i.e., between an advanced square wave and "soft" square wave, between a "soft" square wave and sine wave, or between a sine wave and triangle wave. In some embodiments, power supply 80 may be configured such that knob 82 selects intermediate waveform shapes between an advanced square wave and a triangle wave as seen in FIG. 10A. An intermediate waveform is shown in FIG. 10B for clarity. In FIG. 10A, unlike the waveforms illustrated in FIGS. 9A-C, the intermediate waveforms do not include modified "soft" square waves or modified sine waves.

The present invention is not limited to the exemplary embodiments, including the exemplary waveforms shapes and/or the exemplary waveform generators discussed above. Other waveform generators, whether digital or analog, can be used as long as they can generate and/or select the desired waveform shape from a plurality of waveform shapes.

In the above embodiments, the shape of the output current waveform is regulated to follow the reference waveform. However, the present invention can be used in applications where the shape of the output voltage waveform is regulated. In this case, the feedback signal 240 will be representative of the instantaneous output voltage and the inverter 220 will regulate the output voltage to match the selected reference waveform. In addition, the power supply in the above embodiments has been illustrated as a two-stage power supply. However, the present invention is not limited to a two-stage power supply and can be readily adapted to other types of power supplies. For example, in some embodiments, the power supply 80 can be a three-stage power supply as described in U.S. patent application Ser. No. 10/889,866, filed on Jul. 13, 2004, and incorporated herein by reference in its entirety. The present invention can also be used by power supplies with a single stage inverter or chopper design. While these designs are different in construction, their implementation will be understood by those skilled in the art and will not be further discussed.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

I claim:
1. A power supply with a waveform control function, said power supply comprising:
    a waveform type selector that selects a desired shape for an output waveform of said power supply, a setpoint selector that sets an output setpoint for said power supply;

a comparator circuit that receives a feedback signal corresponding to said output waveform and outputs an error signal representing a difference between said feedback signal and a reference waveform signal;

an inverter circuit that adjusts said output waveform based on said error signal; and a waveform generator comprising, a digital signal processor that generates a digital reference waveform by modifying said desired waveform based on at least said output setpoint, and a digital-to-analog converter that converts said digital reference waveform to said reference waveform signal, wherein the waveform type selector provides a continuous transition between two waveform shapes by morphing through a plurality of intermediate waveform shapes via at least the digital signal processor and the digital-to-analog converter.

2. The power supply of claim 1, wherein said desired waveform shape is selected from a plurality of waveform shapes.

3. The power supply of claim 1, further comprising:

an offset selector which selects a DC offset that is to be injected into said output waveform.

4. The power supply of claim 3, wherein said generation of said digital reference waveform is further based on at least said DC offset.

5. The power supply of claim 1, wherein the output setpoint comprises a peak output current value.

6. The power supply of claim 1, wherein said waveform type selector comprises a plurality of discrete settings corresponding to a plurality of waveform shapes, respectively.

7. The power supply of claim 1, wherein said desired waveform shape is selected from a plurality of waveform shapes comprising at least a sine wave.

8. The power supply of claim 1, wherein said desired waveform shape is selected from a plurality of waveform shapes comprising at least an advanced square wave.

9. The power supply of claim 1, wherein said desired waveform shape is selected from a plurality of waveform shapes comprising at least a soft square wave.

10. The power supply of claim 1, wherein said desired waveform shape is selected from a plurality of waveform shapes comprising at least a triangle wave.

11. The power supply of claim 1, further comprising a balance selector which selects a balance setting corresponding to an amount of time per cycle said output waveform is in a positive portion of said output waveform.

12. The power supply of claim 11, wherein said generation of said digital reference waveform is further based on said balance setting.

13. The power supply of claim 1, further comprising a frequency selector which selects an output frequency for said output waveform.

14. The power supply of claim 13, wherein said generation of said digital reference waveform is further based on said output frequency.

15. The power supply of claim 1, wherein the output setpoint comprises an average output current value.

16. The power supply of claim 1, wherein the output setpoint comprises a peak output voltage value.

17. The power supply of claim 1, wherein the output setpoint comprises an output voltage value.

18. A waveform control method performed by a power supply, said method comprising:

selecting a desired shape for an output waveform of the power supply;

setting an output setpoint for the power supply;

receiving a feedback signal corresponding to the output waveform and outputting an error signal representing a difference between the feedback signal and a reference waveform signal;

adjusting the output waveform based on the error signal;

generating a digital reference waveform by modifying the desired waveform based on at least the output setpoint;

converting the digital reference waveform to the reference waveform signal; and transitioning between two waveform shapes in a continuous manner by morphing through a plurality of intermediate waveform shapes.

19. The method of claim 18, wherein the desired waveform shape is selected from a plurality of waveform shapes, and wherein the plurality of waveform shapes comprise at least one of a sine wave, an advanced square wave, a soft square wave, and a triangle wave.

20. The method of claim 18, further comprising:

selecting a DC offset that is to be injected into the output waveform;

selecting a balance setting corresponding to an amount of time per cycle the output waveform is in a positive portion of the output waveform; and selecting an output frequency for the output waveform.

\* \* \* \* \*